United States Patent
Shin et al.

(10) Patent No.: US 11,251,505 B2
(45) Date of Patent: Feb. 15, 2022

(54) BATTERY MODULE, AND BATTERY PACK AND VEHICLE COMPRISING SAME

(71) Applicant: LG Energy Solution, Ltd., Seoul (KR)

(72) Inventors: Eun-Gyu Shin, Daejeon (KR); Jung-Hoon Lee, Daejeon (KR); Jeong-O Mun, Daejeon (KR); Byoung-Cheon Jeong, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/347,316

(22) PCT Filed: Apr. 3, 2018

(86) PCT No.: PCT/KR2018/003922
§ 371 (c)(1),
(2) Date: May 3, 2019

(87) PCT Pub. No.: WO2018/186659
PCT Pub. Date: Oct. 11, 2018

(65) Prior Publication Data
US 2020/0058918 A1 Feb. 20, 2020

(30) Foreign Application Priority Data
Apr. 7, 2017 (KR) .......................... 10-2017-0045416

(51) Int. Cl.
*H01M 50/00* (2021.01)
*H01M 50/543* (2021.01)
(Continued)

(52) U.S. Cl.
CPC ....... *H01M 50/543* (2021.01); *H01M 10/625* (2015.04); *H01M 50/20* (2021.01); *H01M 50/54* (2021.01)

(58) Field of Classification Search
CPC ..... Y02E 60/10; H01M 50/20; H01M 50/543; H01M 50/54; H01M 10/625
See application file for complete search history.

(56) References Cited

U.S. PATENT DOCUMENTS 7,032,433 B2 * 4/2006 Hayashi .............. G01N 27/407
204/424
2006/0216593 A1 * 9/2006 Jung ................... H01M 10/052
429/178

(Continued)

FOREIGN PATENT DOCUMENTS

| CN | 103931018 A | 7/2014 |
| CN | 105794015 A | 7/2016 |

(Continued)

OTHER PUBLICATIONS

International Search Report for PCT/KR2018/003922 dated Aug. 2, 2018.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

A battery module according to the present disclosure includes a cell assembly including a plurality of battery cells stacked in a vertical direction, each battery cell having an electrode lead in a shape of a plate that protrudes forward in a depth direction perpendicular to the vertical direction, the electrode lead being bent for surface contact in the vertical direction with an adjacent electrode lead, the electrode lead having a protruding part that protrudes forward in the depth direction from a front side end thereof, and a sensing terminal module having a plurality of sensing terminals made of an electrically conductive material and a plurality terminal seating holes in which corresponding ones of the (Continued)

sensing terminals are seated and supported, the protruding part of each electrode lead being press-fit into a corresponding one of the sensing terminals which compresses around the protruding part.

9 Claims, 12 Drawing Sheets

(51) Int. Cl.
*H01M 10/625* (2014.01)
*H01M 50/20* (2021.01)
*H01M 50/54* (2021.01)

(56) References Cited

U.S. PATENT DOCUMENTS

| | | | |
|---|---|---|---|
| 2010/0104939 | A1 | 4/2010 | Wang et al. |
| 2014/0248517 | A1 | 9/2014 | Yoshioka |
| 2014/0248518 | A1 | 9/2014 | Yoshioka |
| 2015/0140380 | A1 | 5/2015 | Kang et al. |
| 2016/0133898 | A1 | 5/2016 | Choi et al. |
| 2016/0190659 | A1 | 6/2016 | Moon et al. |
| 2016/0240893 | A1 | 8/2016 | Lee |
| 2016/0268652 | A1 | 9/2016 | Eom et al. |
| 2017/0309872 | A1 | 10/2017 | Kuboki et al. |

FOREIGN PATENT DOCUMENTS

| | | |
|---|---|---|
| CN | 205882054 U | 1/2017 |
| JP | 2008146943 A | 6/2008 |
| JP | 2013105699 A | 5/2013 |
| JP | 2013105700 A | 5/2013 |
| JP | 201681828 A | 5/2016 |
| JP | 2016143576 A | 8/2016 |
| KR | 20070081302 A | 8/2007 |
| KR | 20100035944 A | 4/2010 |
| KR | 20120074250 A | 7/2012 |
| KR | 101186628 B1 | 9/2012 |
| KR | 20140049654 A | 4/2014 |
| KR | 20140084563 A | 7/2014 |
| KR | 20150025309 A | 3/2015 |
| KR | 20150056885 A | 5/2015 |
| KR | 20150062743 A | 6/2015 |
| KR | 20150062777 A | 6/2015 |
| KR | 20150115250 A | 10/2015 |
| KR | 20150115610 A | 10/2015 |
| KR | 20160094909 A | 8/2016 |
| WO | 2007102670 A1 | 9/2007 |

OTHER PUBLICATIONS

Extended European Search Report including the Written Opinion for Application No. EP 18781665.7 dated Mar. 23, 2020, 8 pages.
Chinese Search Report for Application No. 201880005432.8 dated Oct. 11, 2021, 3 Pages.

* cited by examiner

BATTERY MODULE, AND BATTERY PACK AND VEHICLE COMPRISING SAME

The present application is a national phase entry under 35 U.S.C. § 371 of International Patent Application No. PCT/KR2018/003922, filed on Apr. 3, 2018, published in Korean, which claims priority from Korean Patent Application No. 10-2017-0045416 filed on Apr. 7, 2017, the disclosures of which are hereby incorporated herein by reference.

TECHNICAL FIELD

The present disclosure relates to a battery module and a battery pack and a vehicle comprising the same, and more particularly, to a battery module with improved stability of electrical connection between an electrode lead and a sensing terminal and a battery pack and a vehicle comprising the same.

BACKGROUND ART

Recently, with the dramatically increasing demand for portable electronic products such as laptop computers, video cameras, mobile phones, and the like, along with the extensive development of electric vehicles, accumulators for energy storage, robots, satellites, and the like, many studies are being made on high performance secondary batteries that can be repeatedly recharged.

Currently, commercially available secondary batteries include nickel cadmium batteries, nickel hydrogen batteries, nickel zinc batteries, lithium secondary batteries and the like, and among them, lithium secondary batteries have little or no memory effect, and thus they are gaining more attention than nickel-based secondary batteries for their advantages of free charging/discharging, very low self-discharging, and high energy density.

A lithium secondary battery usually uses a lithium-based oxide and a carbon material for a positive electrode active material and a negative electrode active material respectively. The lithium secondary battery includes an electrode assembly including a positive electrode plate and a negative electrode plate respectively coated with the positive electrode active material and the negative electrode active material with a separator interposed between, and a packaging or a battery case to hermetically receive the electrode assembly together with an electrolyte solution.

In general, lithium secondary batteries may be classified into can-type secondary batteries in which an electrode assembly is embedded in a metal can and pouch-type secondary batteries in which an electrode assembly is embedded in a pouch of an aluminum laminate sheet according to the shape of the case.

More recently, secondary batteries are being widely used in not only small devices such as portable electronic devices but also medium- and large-scale devices such as vehicles or energy storage systems. In particular, with the steady exhaustion of carbon energy and increasing interest in the environment, attention is paid to hybrid electric vehicles and electric vehicles all over the world including United States, Europe, Japan and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing. The battery pack of hybrid electric vehicles or electric vehicles includes a plurality of secondary batteries, and the plurality of secondary batteries is connected in series and in parallel to improve the capacity and output.

Meanwhile, in addition to the secondary batteries, the battery pack includes various battery pack protection devices such as Battery Management System (BMS). The protection devices may play many roles including managing the charge/discharge of the battery pack and ensuring safety. The protection devices may perform their functions in view of many factors, and a typical one of these factors is voltage of each secondary battery. For example, a specific protection device may prevent the overcharge or overdischarge of each secondary battery through voltage values across two ends of the corresponding secondary batteries, and perform a balancing function to reduce differences in state of charge between the secondary batteries.

In executing a specific function of the protection device included in the battery pack, sensing the voltage of each secondary battery included in the battery pack is very important and essential, and thus configuration for detecting the voltage of the secondary batteries is applied to most of conventional battery packs.

FIG. 1 is a diagram showing a conventional battery module of a sensing structure in which an electrode lead and a receptacle are connected.

Referring to FIG. 1, the conventional battery module includes a bus bar 2 joined with the electrode lead by welding and the receptacle 3 connected to the bus bar 2 by mechanically applying the pressure to the bus bar 2, to form a sensing structure for voltage detection.

As described above, because the receptacle 3 and the bus bar 2 are only coupled by the pressure applied from the receptacle 3 of peg type without a separate fixing device, its problem is that connection is easily disconnected by the external pressure and vibration.

FIG. 2 is a diagram showing a conventional battery module of a sensing structure using a printed circuit board.

Referring to FIG. 2, the conventional battery module of a sensing structure using the conventional printed circuit board has a sensing structure for voltage detection by pre-soldering the bus bar 2 to a soldering area S of the printed circuit board 4 and fixing the electrode lead and the bus bar 2 using a structure or by welding.

Because the conventional battery module of a sensing structure using the printed circuit board 4 uses the printed circuit board 4 to which the bus bar 2 is pre-soldered as described above, its problem is that a soldering process of the printed circuit board 4 and the bus bar 2 is added to the process of manufacturing the battery module, and an error in voltage detection occurs due to frequent faults occurring in the soldering process.

FIG. 3 is a diagram showing a conventional battery module of a sensing structure using a clamping type bus bar.

Referring to FIG. 3, the conventional battery module has a sensing structure for voltage detection by welding the clamping type bus bar 5 to a welding area W of the electrode lead to electrically connect the clamping type bus bar 5 and the electrode lead.

Subsequently, a plurality of wires 6 extending from the end of the clamping type bus bar 5 is arranged outside of the battery module, to manufacture the battery module.

The problem of the conventional battery module of a sensing structure using the clamping type bus bar 5 is that a process of welding the clamping type bus bar 5 and the electrode lead and a process of arranging the plurality of wires 6 outside in the course of assembling the battery module are additionally needed, and the energy density of the battery module reduces due to the plurality of wires 6.

DISCLOSURE

Technical Problem

The present disclosure is directed to providing a battery module with improved stability of electrical connection between an electrode lead and a sensing terminal and a battery pack and a vehicle comprising the same.

The present disclosure is further directed to providing a battery module in which a sensing terminal for sensing the voltage of a battery cell and an electrode lead are only coupled by an assembling process through pressing and a battery pack and a vehicle comprising the same.

The objects of the present disclosure are not limited to the above-mentioned objects and these and other objects and advantages of the present disclosure can be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, a battery module according to the present disclosure includes a cell assembly including a plurality of battery cells stacked in a vertical direction, each battery cell having an electrode lead in a shape of a plate that protrudes forward in a depth direction perpendicular to the vertical direction, the electrode lead being bent for surface contact in the vertical direction with an adjacent electrode lead, the electrode lead having a protruding part that protrudes forward in the depth direction from a front side end thereof, and a sensing terminal module having a plurality of sensing terminals made of an electrically conductive material and a pourality of terminal seating holes in which corresponding ones of the sensing terminals are seated and supported, the protruding part of each electrode lead being press-fit into a corresponding one of the sensing terminals which compresses around the protruding part.

Preferably, the cell assembly may include a plurality of adhesive members, each adhesive member being provided between an adjacent pair of the electrode leads in surface contact with the electrode leads so as to adhere the electrode leads to one another.

Preferably, each adhesive member may be made of an electrically conductive material.

Preferably, each of the adhesive members may be provided between adjacent ones of the protruding parts so as to adhere the protruding parts to one another.

Preferably, each protruding part may have a width in a horizontal direction perpendicular to the vertical direction and the depth direction that is equal to or less than a width of the corresponding electrode lead in the horizontal direction.

Preferably, each sensing terminal may include a contact terminal part and a compression terminal part, the contact terminal part being in contact with the corresponding protruding part, the compression terminal part extending from opposite sides of the contact terminal part and compressing around the protruding part.

Preferably, the contact terminal part of each sensing terminal may have a pressing protrusion therein that presses into a surface of the corresponding protruding part.

Preferably, the battery module may further include a sensing cover coupled to a side surface of the cell assembly at which the electrode leads are disposed, the sensing cover covering the electrode leads.

Preferably, the sensing cover may have a plurality of through-holes, each through-hole extending in the depth direction, each protruding part being inserted into a corresponding one of the through-holes.

Preferably, the sensing cover may have a module seating part onto which the sensing terminal module is seated and supported, the module seating part extending away from the cell assembly in the depth direction.

A battery pack according to the present disclosure may include the above-described battery module.

A vehicle according to the present disclosure may include the above-described battery module.

Advantageous Effects

According to the present disclosure, it is possible to improve stability of electrical connection of the electrode lead and the sensing terminal.

Additionally, the present disclosure only connects the electrode lead and the sensing terminal by a process through pressing without a welding process and a soldering process, thereby simplifying the process of manufacturing a battery module and reducing an error ratio.

MODE FOR CARRYING OUT THE INVENTION

Figure 1:
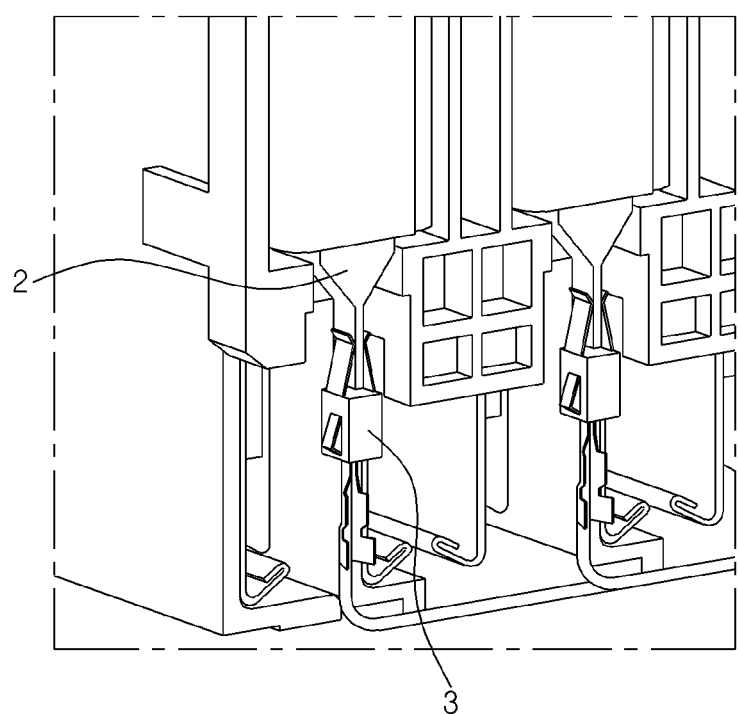
FIG. 1 is a diagram showing a conventional battery module of a sensing structure in which an electrode lead and a receptacle are connected.
Figure 2:
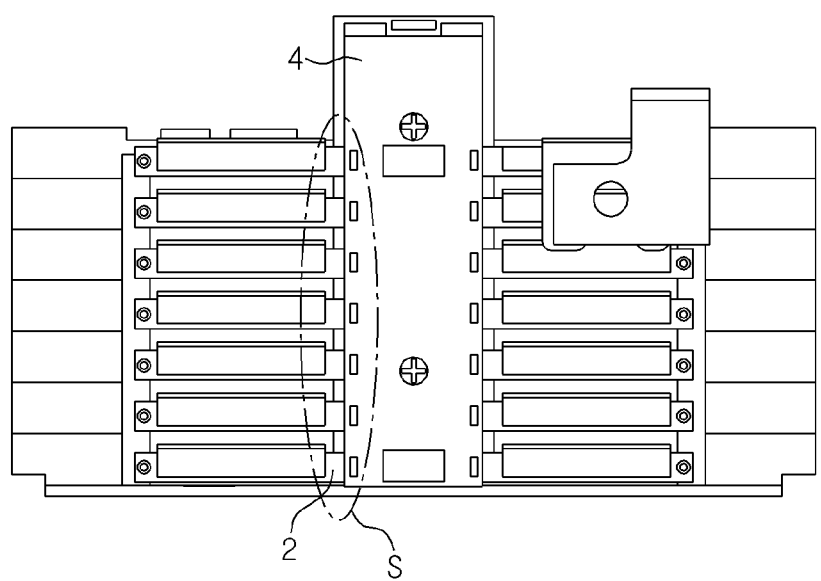
FIG. 2 is a diagram showing a conventional battery module of a sensing structure using a printed circuit board.
Figure 3:
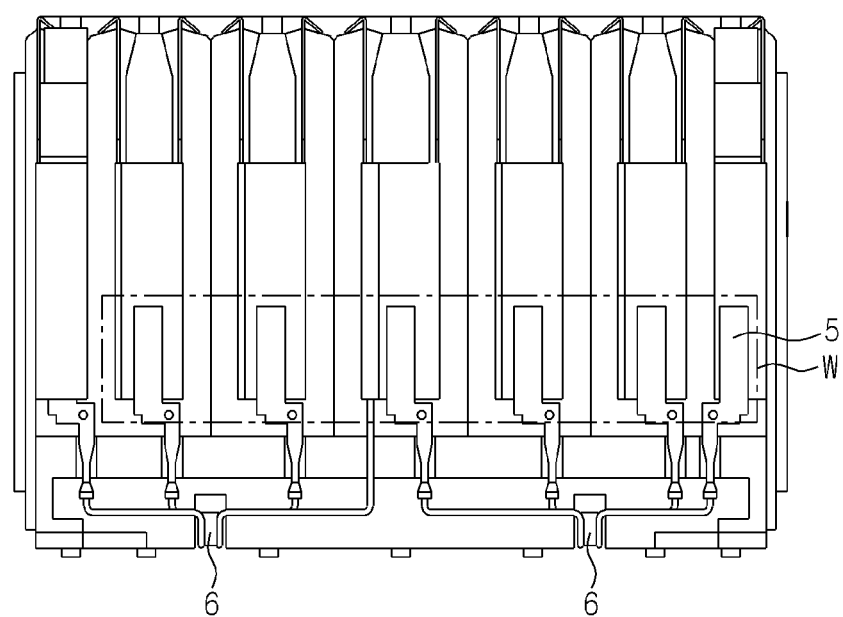
FIG. 3 is a diagram showing a conventional battery module of a sensing structure using a clamping type bus bar.

The above-described objects, features and advantages will be described in detail with reference to the accompanying drawings, and accordingly, those having ordinary skill in the technical field pertaining to the present disclosure will easily practice the technical aspects of the present disclosure. In describing the present disclosure, when it is deemed that a detailed description of relevant known technology unnecessarily renders the key subject matter of the present disclosure ambiguous, the detailed description is omitted herein. Hereinafter, preferred embodiments of the present disclosure will be described in detail with reference to the accompanying drawings. In the drawings, like reference numerals are used to indicate like or similar elements.

Figure 4:
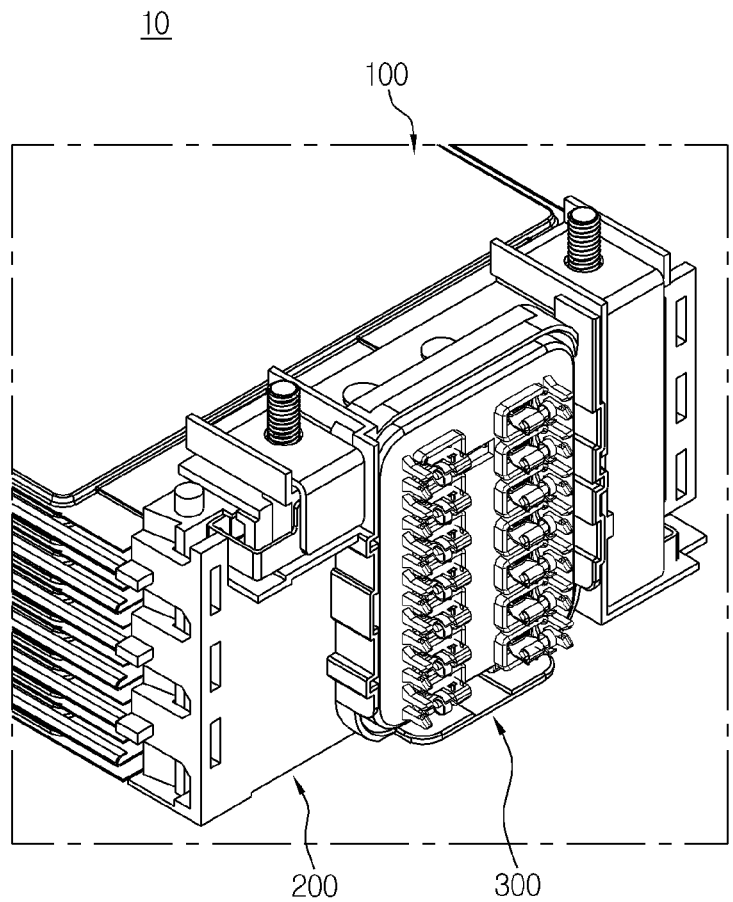
FIG. 4 is a partial perspective view of a battery module according to an embodiment of the present disclosure.
Figure 4:
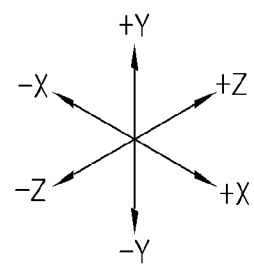
Figure 5:
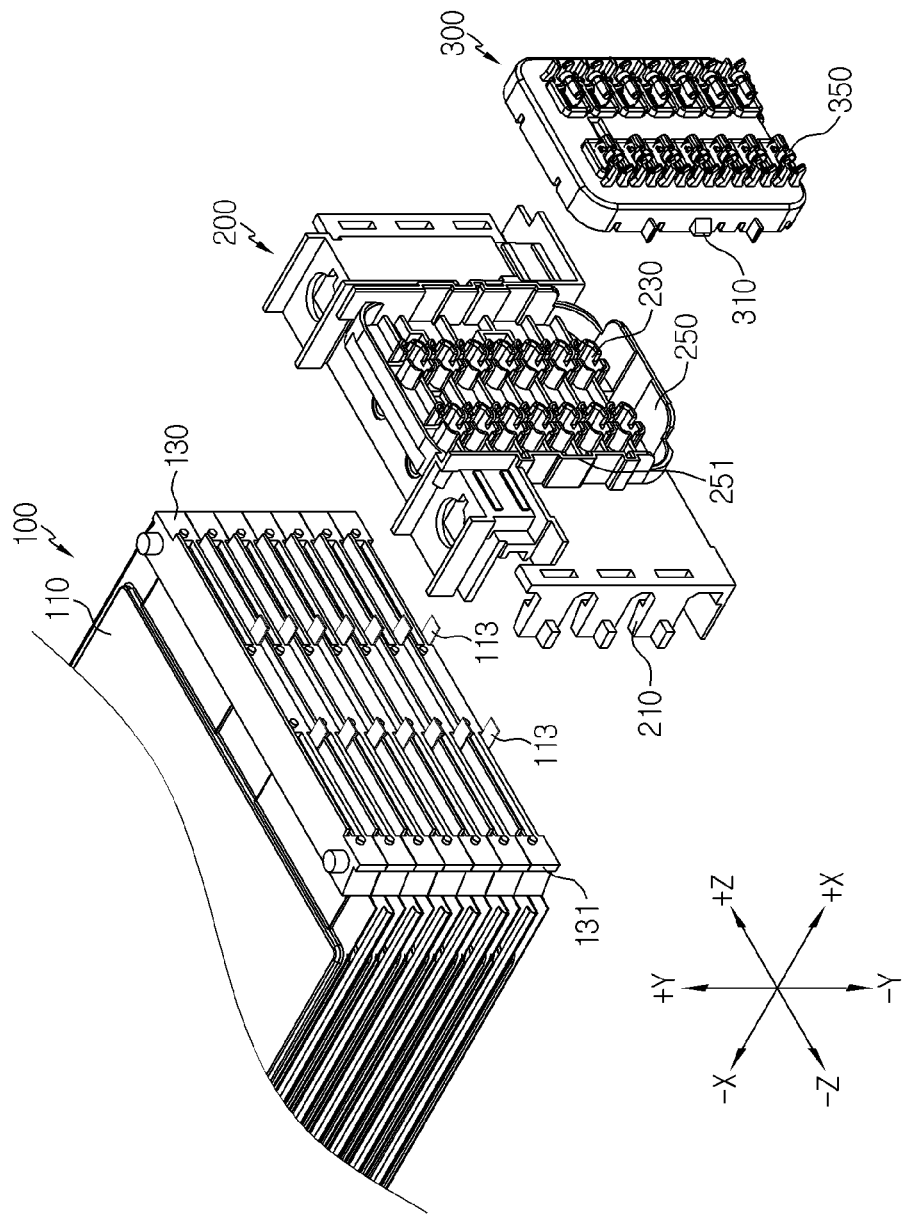
FIG. 5 is a partial exploded perspective view of a battery module according to an embodiment of the present disclosure.

FIG. 4 is a partial perspective view of a battery module according to an embodiment of the present disclosure, and FIG. 5 is a partial exploded perspective view of the battery module according to an embodiment of the present disclosure.

Referring to FIGS. 4 and 5, the battery module 10 according to an embodiment of the present disclosure may include a cell assembly 100, a sensing cover 200 and a sensing terminal module 300.

The cell assembly 100 may include a battery cell 110.

A plurality of battery cells 110 may be provided, and each battery cell 110 may be stacked on top of one another in up-down direction (±Y axis direction).

The battery cell 110 is not limited to a particular type, and various types of secondary batteries may be used in the cell assembly 100 of the battery module 10 according to the present disclosure. For example, the battery cell 110 may include lithium ion batteries, lithium polymer batteries, nickel cadmium batteries, nickel hydrogen batteries and nickel zinc batteries. Particularly, the battery cell 110 may be a lithium secondary battery.

Meanwhile, the battery cell 110 may be classified into pouch type, cylindrical and prismatic according to the type of case. Particularly, the battery cell 110 of the battery module 10 according to the present disclosure may be a pouch-type secondary battery.

When the battery cell 110 is a pouch-type secondary battery, as shown in FIGS. 4 and 5, each battery cell 110 is arranged with wide surfaces positioned on top of one another, and the wide surfaces between each battery cell 100 face each other. Additionally, in this case, each battery cell 110 may have an electrode lead that protrudes in horizontal direction (+X axis direction).

The electrode lead may include a positive electrode lead and a negative electrode lead, and the positive electrode lead may be connected to a positive electrode plate of an electrode assembly and the negative electrode lead may be connected to a negative electrode plate of the electrode assembly.

Hereinafter, the structure of the electrode lead will be described in detail with reference to FIGS. 6 and 7.

Figure 6:
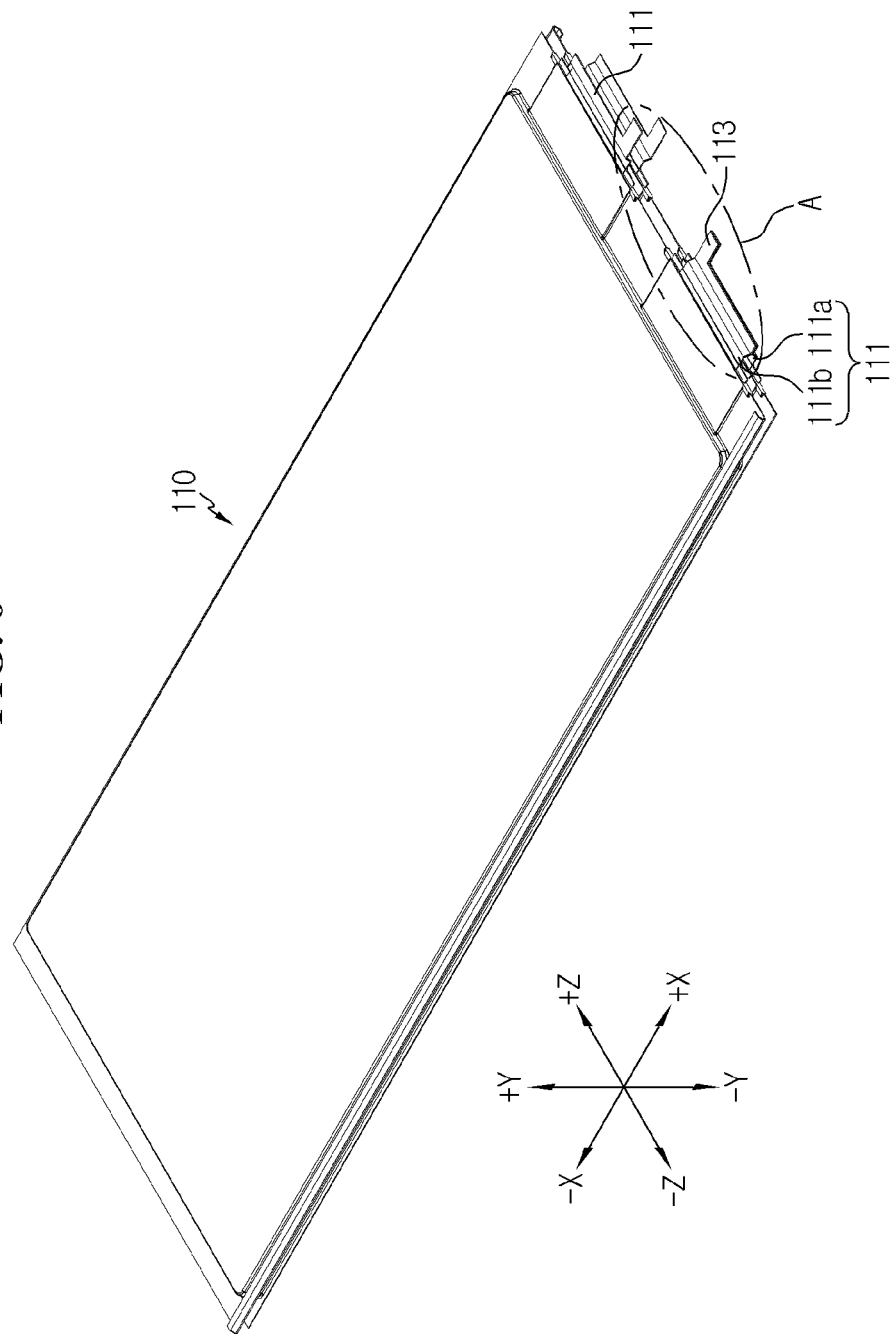
FIG. 6 is a schematic perspective view of a battery cell according to an embodiment of the present disclosure.
Figure 7:
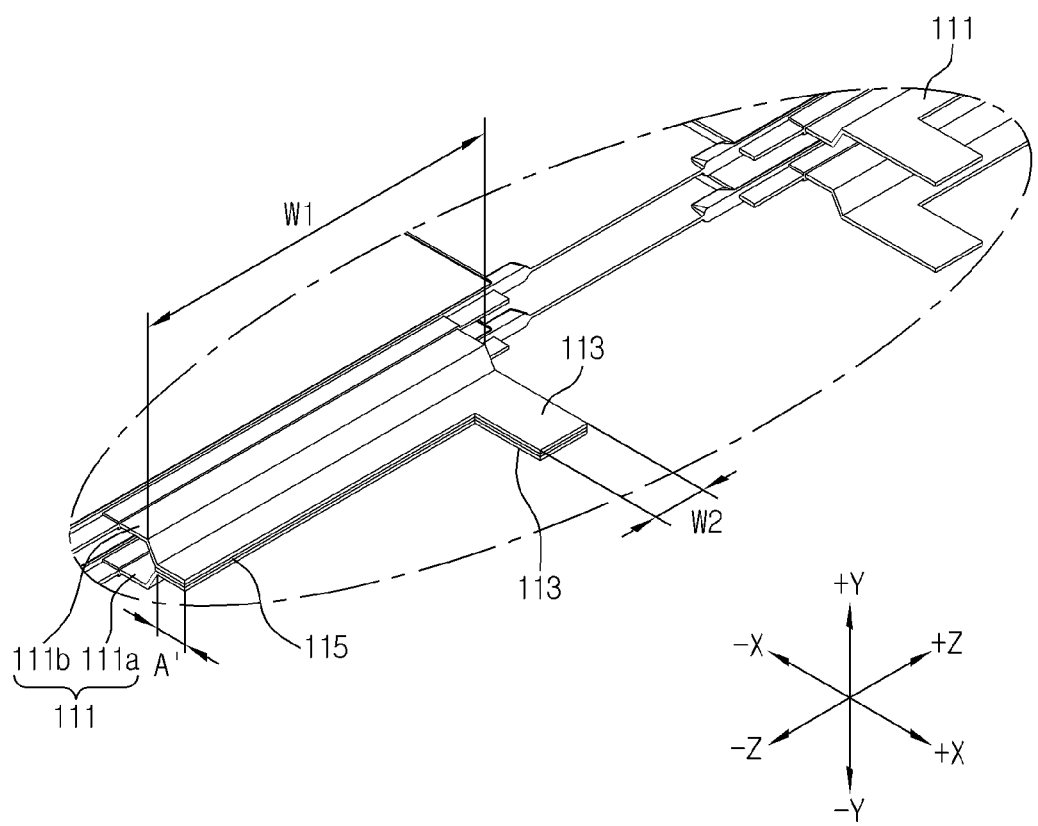
FIG. 7 is an enlarged view of section A of FIG. 6.

FIG. 6 is a schematic perspective view of the battery cell according to an embodiment of the present disclosure, and FIG. 7 is an enlarged view of section A of FIG. 6.

Referring to FIGS. 6 and 7, the electrode lead 111 may be formed in a plate shape and protrude in horizontal direction (+X axis direction). Particularly, the electrode lead 111 provided in the battery cell 110 may be bent toward an electrode lead of another battery cell stacked above or below. For example, in the configuration of FIGS. 6 and 7, among two electrode leads 111a, 111b disposed on the left side (−Z axis direction) of the electrode leads 111 provided in two battery cells 110 stacked vertically, the electrode lead 111a disposed in lower position may protrude and extend in horizontal direction (+X axis direction, forward), be bent in upward direction (+Y axis direction, +X axis direction), and extend in horizontal direction (+X axis direction) again. Additionally, among two electrode leads 111a, 111b on the left side, the electrode lead 111b disposed on upper position may protrude and extend in horizontal direction (+X axis direction), be bent in downward direction (−Y axis direction, +X axis direction), and extend in horizontal direction (+X axis direction) again.

In this instance, regions (A' region of FIG. 7) where the two adjacent electrode leads 111a, 111b extend in horizontal direction (+X axis direction) after bent may have surface contact with each other. Through this, the plurality of battery cells 110 may be electrically connected to form the cell assembly (100 in FIG. 4).

Meanwhile, a joining member 115 may be provided between the A' regions of the two adjacent electrode leads 111a, 111b to join the electrode leads 111a, 111b. Here, the joining member 150 may be made of an electrical conductive material to electrically connect the electrode leads 111a, 111b.

Through this, the joining member 150 maintains a secure electrical connection between the electrode leads 111a, 111b, thereby preventing a short circuit between the electrode leads 111a, 111b that may occur due to an external impact or vibration.

Meanwhile, the protruding part 113 protruding in forward horizontal direction (+X axis direction) may be formed at an end (front end) of the front side of the electrode lead 111. The protruding part 113 may be formed with the same thickness as the other parts of the electrode lead 111. That is, the electrode lead 111 and the protruding part 113 may be formed with the same thickness in whole. Additionally, the protruding part 113 may have a predetermined left-right direction width W2. Here, the left-right direction width may be, in other words, a length that is measured on the basis of ±Z axis.

More specifically, the left-right direction width W2 of the protruding part 113 may be equal to or less than the left-right direction width W1 of the electrode lead 111. Additionally, the protruding part 113 may be integrally formed with the electrode lead 111.

Meanwhile, the protruding part 113 may be formed in both the two electrode leads 111 that are stacked in up-down direction (±Y axis direction) and connected to each other. In this case, a joining member 115 may be also provided between the two protruding parts 113 disposed in up-down direction (±Y axis direction). Additionally, the joining member 115 may join the two adjacent stacked protruding parts 113. Accordingly, not only the electrode leads 111a, 111b but also the protruding parts 113 may be electrically connected through the joining member 115. According to the embodiment of this configuration, a portion of the front end of the joining member 115 may protrude forward corresponding to the shape of the electrode lead 111a, 111b having the protruding part 113 at the front end.

The protruding part 113 may be fit-coupled to a sensing terminal. Additionally, the sensing terminal may be provided in the sensing terminal module.

Through this, the protruding part 113 of the electrode lead 111 according to the present disclosure is directly connected to the sensing terminal to prevent instability of electrical connection that occurs in the process of mechanically connecting the receptacle or wire to the bus bar welded to the electrode lead.

The above-described connection configuration between the protruding part 113 and the sensing terminal will be described in detail below.

Returning to FIGS. 4 and 5, another configuration of the battery module 10 will be described.

The sensing cover 200 may include a hook 210, a through-hole 230 and a module seating part 250.

The sensing cover 200 may be coupled with the cell assembly 100 when the hook 210 formed at one end and the other end is engaged with a hook coupling part of a lead cartridge as described below. Here, the sensing cover 200 may cover the side surface of the cell assembly 100 where the electrode lead is formed.

That is, the sensing cover 200 may be coupled with the cell assembly 100 to cover the side surface of the cell assembly 100 in order not to expose the electrode lead and the lead cartridge 130 to the outside.

The through-hole 230 may be formed at a location corresponding to the location of the protruding part 113 when the sensing cover 200 and the cell assembly 100 are coupled.

The protruding part 113 passes through the through-hole 230 in a direction (+X axis direction) in which the protruding part 113 protrudes. Through this, when the sensing cover 200 is coupled to the cell assembly 100, the protruding part 113 may pass through the through-hole 230 and protrude from the sensing cover 200.

Through this, the protruding part 113 may protrude to reach the sensing terminal and be coupled with the sensing terminal.

To this end, the depth of the through-hole 230 may be smaller than the length of the protruding part 113.

Additionally, the number of through-holes 230 may correspond to the number of protruding parts 113. For example, as shown in FIG. 5, in one cell assembly 100, a total of 14 protruding parts 113 may be provided, two in left-right direction (±X axis direction) and seven rows in up-down direction (±Y axis direction). In this case, a total of 14 through-holes 230 may be provided corresponding to the number and arrangement of protruding parts 113, each two in seven rows.

Meanwhile, the sensing cover 200 may have the module seating part 250 on which the sensing terminal module 300 is supported and seated in the opposite direction to the cell assembly 100. More specifically, the module seating part 250 may be formed in a shape corresponding to the contact surface with the sensing terminal module 300 when the sensing cover 200 and the sensing terminal module 300 are coupled.

Through this, the sensing terminal module 300 may be supported so that it does not separate from the sensing cover 200.

To this end, the guide groove 251 may be formed on the outer periphery of the module seating part 250 to guide the movement of the sensing terminal module 300 when the sensing terminal module 300 enters.

More specifically, a protrusion 310 may protrude on the outer periphery of the sensing terminal module 300 corresponding to the location of the guide groove 251, and when the sensing terminal module 300 enters the module seating part 250, the protrusion 310 may be inserted into a guide groove 251.

Subsequently, the guide groove 251 may guide the movement of the inserted protrusion 310, and support the protrusion 310 so that the sensing terminal module 300 is smoothly seated on the module seating part 250.

Through this, the sensing terminal module 300 may be only coupled in simple manner by a pressing process after moving to the sensing cover 200 coupled to the cell assembly 100 without a separate welding process.

Subsequently, the sensing terminal module 300 will be described in detail with further reference to FIGS. 8 to 10.

Figure 8:
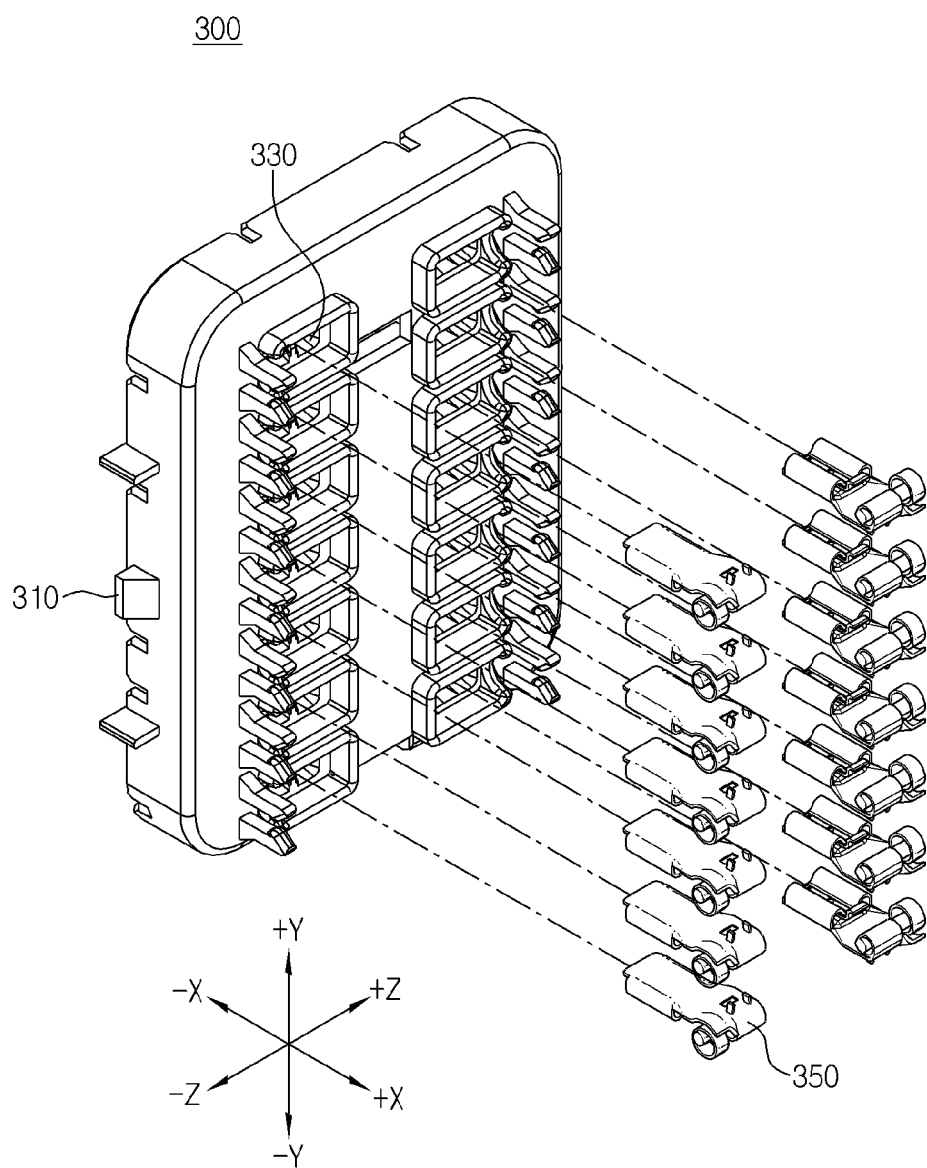
FIG. 8 is an exploded perspective view of a sensing terminal module according to an embodiment of the present disclosure.
Figure 9:
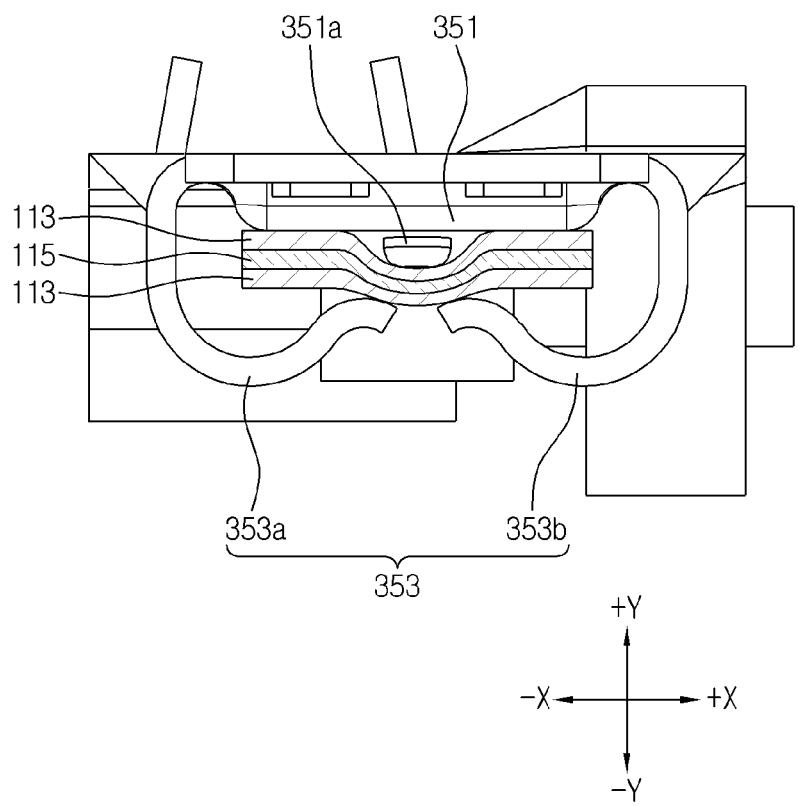
FIG. 9 is a cross-sectional view of a sensing terminal coupled with a protruding part according to an embodiment of the present disclosure.
Figure 10:
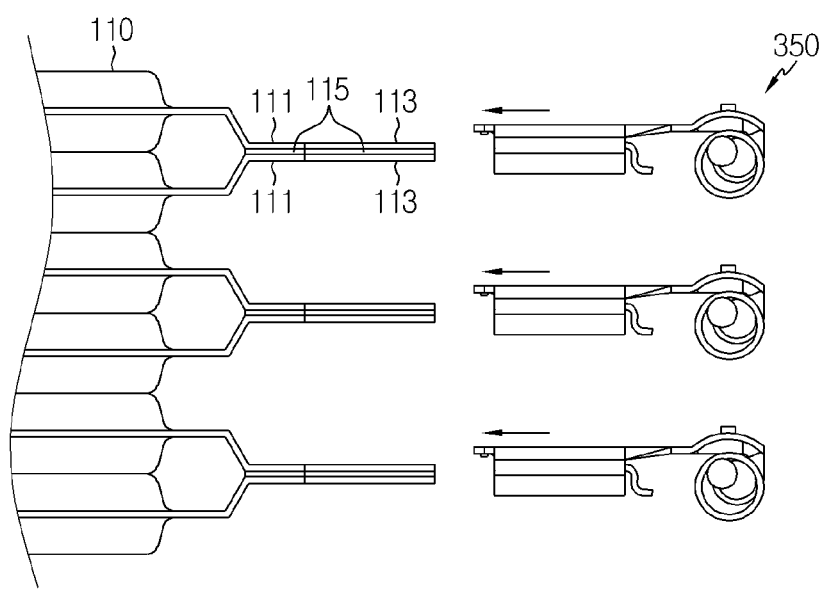
FIG. 10 is a diagram showing a process in which a protruding part and a sensing terminal are coupled according to an embodiment of the present disclosure.

FIG. 8 is an exploded perspective view of the sensing terminal module according to an embodiment of the present disclosure, FIG. 9 is a cross-sectional view of the sensing terminal coupled with the protruding part according to an embodiment of the present disclosure, and FIG. 10 is a diagram showing a process in which the protruding part and the sensing terminal are coupled according to an embodiment of the present disclosure.

In addition to the protruding part 310, the sensing terminal module 300 may further include a terminal seating hole 330 and a sensing terminal 350.

The protrusion 310 protrudes from the outer periphery of the sensing terminal module 300 as described above, and when the sensing terminal module 300 is coupled to the module seating part 250, the protrusion 310 may be inserted into the guide groove 251 of the module seating part 250 and move along the guide groove 251.

Additionally, the protrusion 310 may be supported from the guide groove 251 after entering the guide groove 251 to the end, and may fix the sensing terminal module 300 in the module seating part 250.

Meanwhile, the sensing terminal module 300 may have the terminal seating hole 330 where the sensing terminal 350 is supported and seated in the opposite direction to the sensing cover 200. More specifically, the terminal seating hole 330 may be in the shape of a hole that corresponds to the shape of the sensing terminal 350 and runs in horizontal direction (±X axis direction).

The terminal seating hole 330 may apply the pressure to the sensing terminal 350 from the outer side when the sensing terminal 350 is inserted, supported and seated, to prevent the sensing terminal 350 from separating from it by an external force.

Through this, when the protruding part 113 formed at the end of the electrode lead 111 is inserted into the sensing terminal 350, the pressure applied from the protruding part 113 may prevent the sensing terminal 350 from separating from the terminal seating hole 330.

The sensing terminal 350 may be electrically connected to the electrode lead 111 by the fit-coupling of the protruding part 113 as shown in FIG. 10.

The sensing terminal 350 is a component that is in direct contact with the protruding part 113 integrally formed with the electrode lead 111 to sense the voltage of the battery cell 110, and may be made of an electrical conductive material of metal such as aluminum or copper.

Meanwhile, the sensing terminal 350 may include a contact terminal part 351 that is close contact with the protruding part 113, and a compression terminal part 353 that extends from two sides of the contact terminal part 351 and compresses around the protruding part 113.

The contact terminal part 351 has a flat plate shape, and the protruding part 113 may contact and be coupled below the contact terminal part 351 of flat plate.

In this instance, a pressing protrusion 351a may be formed on the inside surface of the contact terminal part 351 to compress the protruding part 113, thereby improving coupling and fixing strength of the sensing terminal 350 and the protruding part 113.

Meanwhile, as shown in FIG. 9, the compression terminal part 353 may include a first compression terminal part 353a and a second compression terminal part 353b that compress around each of two side surfaces of the protruding part 113. That is, the first compression terminal part 353a and the second compression terminal part 353b may extend from two side surfaces of the contact terminal part 351 and compress around each of the side surfaces of the protruding part 113, thereby compressing and fixing the protruding part 113 more securely.

Particularly, the first compression terminal part 353*a* and the second compression terminal part 353*b* may be bent in downward direction from two sides of the contact terminal part. Additionally, through this bending configuration, the first compression terminal part 353*a* and the second compression terminal part 353*b* may have elasticity. Further, the first compression terminal part 353*a* and the second compression terminal part 353*b* place the protruding part 113 between the first compression terminal part 353*a* and the second compression terminal part 353*b* and the contact terminal part 351, to press up the lower part of the protruding part 113.

Through this, the sensing terminal 350 may increase the coupling and fixing strength with the protruding part 113 through the compression terminal part 353 compressing around the protruding part 113, and particularly, may increase the operation efficiency with no need for separate equipment, for example, welding equipment.

That is, the sensing terminal 350 according to the present disclosure may be pressed and fixed by the pressing protrusion 351 formed in the contact terminal part 351 with which the protruding part 113 is in close contact. Additionally, the first compression terminal part 353*a* and the second compression terminal part 353*b* extending from the contact terminal part 351 compress below the protruding part 113 to fix the protruding part 113 to the sensing terminal 350 securely.

Returning to FIGS. 4 and 5, another configuration of the cell assembly will be described.

Referring to FIGS. 4 and 5, the cell assembly 100 may further include a lead cartridge 130.

The lead cartridge 130 is for mechanically preventing any electrical connection between the electrode leads that is not designed, and may individually receive each electrode lead electrically connected according to the design. To this end, the lead cartridge 130 may have a plurality of spaces inside to individually receive the electrically connected electrode leads.

Additionally, the lead cartridge 130 may run in horizontal direction (±X axis direction) so that the electrode lead is inserted and the above-described protruding part 113 protrudes outwards. Accordingly, the protruding part 113 may be inserted into the inner surface and protrude out of the outer surface while the lead cartridge 130 is coupled with the battery cell 110, and two electrode leads in surface contact may be received in the internal space of the lead cartridge 130.

Through this, the lead cartridge 130 may prevent an unintentional contact between the electrode leads, and prevent damage of the electrode lead that may occur by an external force.

Meanwhile, a hook coupling part 131 to which the hook 210 of the sensing cover 200 as described below is coupled may be formed at one end and the other end of the lead cartridge 130.

In the coupling of the cell assembly 100 and the sensing cover 200, the hook coupling part 131 holds the end of the hook 210 in the opposite direction (+X axis direction) to the coupling direction (−X axis direction), to fix the hook 210 and couple the sensing cover 200 connected to the hook 210 with the cell assembly 100.

Through this, the cell assembly 100 and the sensing cover 200 may be only coupled in simple manner by a process of pressing the sensing cover 200 in the coupling direction (−X axis direction).

Hereinafter, the coupling configuration of the protruding part and the sensing terminal according to another embodiment of the present disclosure will be described.

Figure 11:
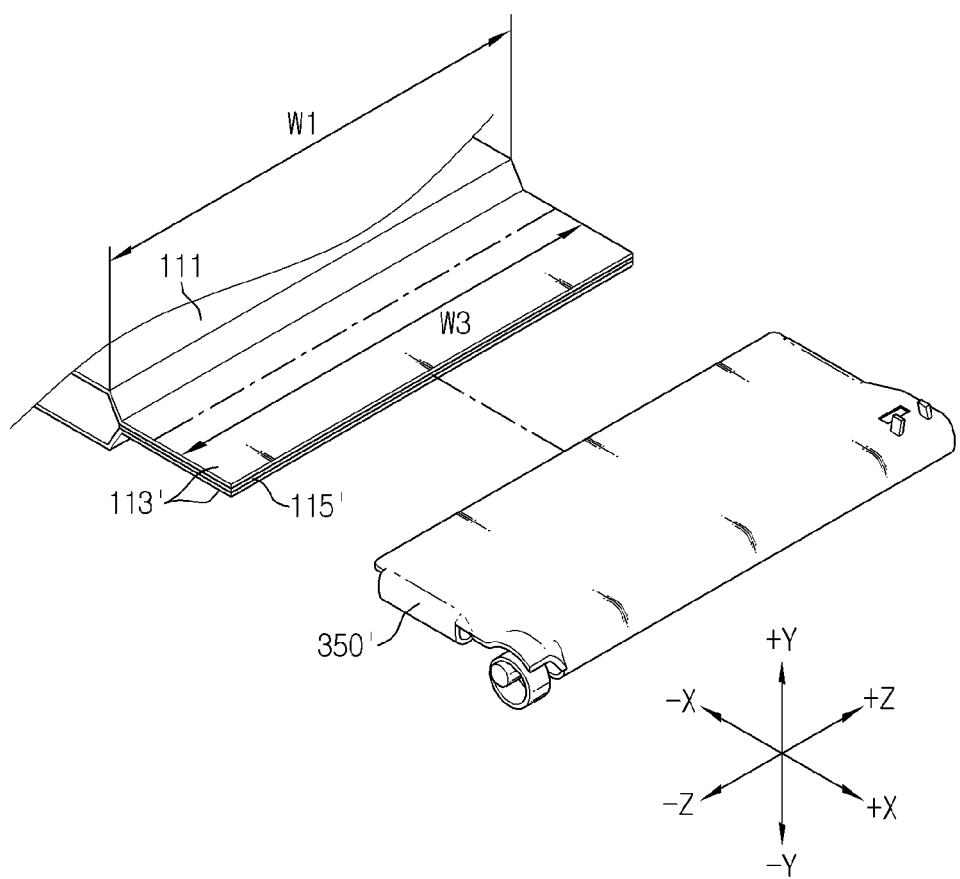
FIG. 11 is a diagram showing a process in which a protruding part and a sensing terminal are coupled according to another embodiment of the present disclosure.
Figure 12:
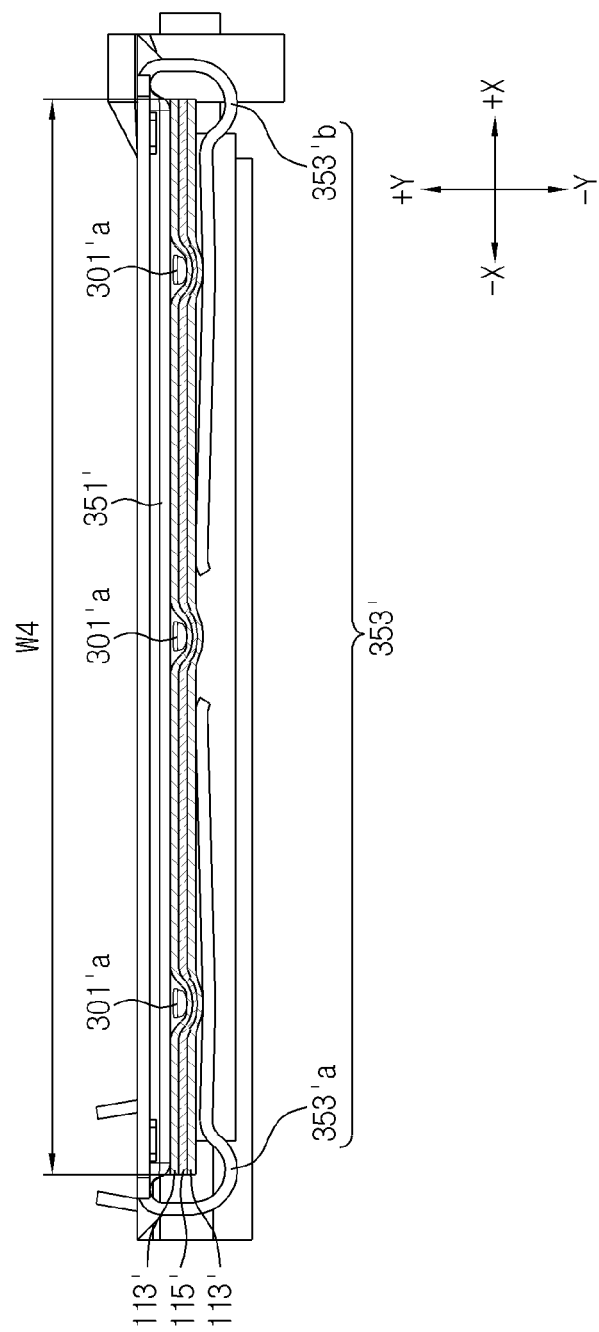
FIG. 12 is a front view of a sensing terminal according to another embodiment.

FIG. 11 is a diagram showing a process in which the protruding part and the sensing terminal are coupled according to another embodiment of the present disclosure, and FIG. 12 is a cross-sectional view of the sensing terminal coupled with the protruding part according to another embodiment.

Referring to FIGS. 11 and 12, the protruding part 113' and the sensing terminal 350' according to another embodiment of the present disclosure have the same or similar role and coupling structure with other components to the protruding part (113 in FIG. 5) and the sensing terminal (350 in FIG. 5) according to an embodiment of the present disclosure as described previously, and a description will be provided based on a difference with a repeated description being omitted herein.

The protruding part 113' according to another embodiment of the present disclosure may protrude in horizontal direction (+X axis direction) from the end of the electrode lead 111, and a left-right direction width W3 of the protruding part (113 in FIG. 5) and the electrode lead 111 according to an embodiment may be equal to the left-right direction width W1 of the electrode lead 111.

That is, the protruding part 113' according to another embodiment may protrude in horizontal direction (+axis direction) while maintaining the same width from the end of the electrode lead 111. Accordingly, the protruding part 113' according to another embodiment can contact the sensing terminal 350' as opposed to the protruding part (113 in FIG. 5) according to an embodiment, thereby increasing the area and improving the coupling strength with the sensing terminal 350' and stability of electrical connection.

Meanwhile, the joining member 115' may be also applied between the protrusions 113' corresponding to the left-right direction width W3 of the protrusion 113' in whole to mechanically join and electrically connect the protrusions 113'.

Meanwhile, the sensing terminal 350' according to another embodiment may include a contact terminal part 351' and a compression terminal part 353' with a left-right direction width W4 corresponding to the left-right direction width W3 of the protrusion 113'.

As described above, the protruding part 113' of the electrode lead 111 fit-coupled to the sensing terminal 350' may be coupled in surface contact with the contact terminal part 351'. In this instance, the left-right direction width W4 of the contact terminal part 351' may be equal to or longer than the left-right direction width W3 of the protruding part 113' by a predetermined length.

According to this configuration of the present disclosure, the protruding part 113' according to another embodiment has a longer width and a wider area than the protruding part (113 in FIG. 5) according to an embodiment, and thus may be seated and supported on the sensing terminal 350' more stably. Accordingly, in this case, mechanical support and electrical connectivity between the electrode lead 111 and the sensing terminal 350' may be maintained more stably.

Meanwhile, a plurality of protruding parts may be provided according to still another embodiment of the present disclosure. More specifically, the protruding parts according to still another embodiment of the present disclosure may be formed in the shape of a plurality of plates that protrudes in horizontal direction (+X axis direction) from the end of the electrode lead, spaced apart from each other. For example, in the case of three protruding parts according to still another embodiment of the present disclosure, the protruding parts may include a first protruding part, a second protruding part and a third protruding part that protrude from one end, the other end and the center of the electrode lead respectively, spaced apart from each other.

Through this, the protruding part according to still another embodiment of the present disclosure may be formed at a point to which a coupling force from the sensing terminal 350' is applied, thereby improving the coupling and fixing strength with the sensing terminal 350'.

Meanwhile, the contact terminal part 351' according to the embodiment of FIGS. 11 and 12 may have a plurality of pressing protrusions 301'a corresponding to the left-right direction width W3 of the protruding part 113' on the inside surface to press the protruding part 113', thereby improving the coupling and fixing strength between the sensing terminal 350' and the protruding part 113'.

The sensing terminal 350' according to another embodiment of FIGS. 11 and 12 may further include a compression terminal part 353' that extends from two sides of the contact terminal part 351' and compresses around the protruding part 113'.

The compression terminal part 353' may include a first compression terminal part 353'a and a second compression terminal part 353'b that extend from two side surfaces of the contact terminal part 351' and compress around each of the side surfaces of the protruding part 113'.

The first compression terminal part 353'a and the second compression terminal part 353'b according to another embodiment may be formed such that the end compressing the protruding part 113' extends corresponding to the left-right direction width W3 of the protruding part 113'.

That is, to securely compress the long and wide protruding part 113', each end part of the first compression terminal part 353'a and the second compression terminal part 353'b according to this embodiment may extend longitudinally to the center of the protruding part 113' to compress the protruding part 113'. In this case, the first compression terminal part 353'a and the second compression terminal part 353'b may have a bending part in a curved shape that is bent from two sides of the contact terminal part 351', and a flat part that extends flat in a direction toward the center of the protruding part 113', i.e., inward direction from each bending part.

Through this, the sensing terminal 351' and the protruding part 113' may be coupled in surface contact over the wide area and electrically connected to each other, thereby improving stability of mechanical coupling and stability of electrical connection.

Meanwhile, the battery pack according to the present disclosure includes at least one battery module described above. In this instance, in addition to the battery module, the battery pack may further include a case to receive the battery module and various types of devices to control the charge/discharge of the battery module, for example, a Battery Management System (BMS), a current sensor, a fuse, and the like. Particularly, the battery pack according to an embodiment of the present disclosure may have an electrical connection of the sensing terminal seated in the sensing terminal module of the battery module and the connection terminal of the BMS.

The battery module according to the present disclosure may be applied to a vehicle such as an electric vehicle or a hybrid electric vehicle. That is, the vehicle according to the present disclosure may include the battery module according to the present disclosure.

The above-described present disclosure is not limited to the above-described embodiments and the accompanying drawings, and many substitutions, modifications and changes may be made thereto by those having ordinary skill in the technical field pertaining to the present disclosure without departing from the technical aspects of the present disclosure.

What is claimed is:

1. A battery module comprising:
   a cell assembly including a plurality of battery cells stacked in a vertical direction, each battery cell having an electrode lead in a shape of a plate that protrudes forward in a depth direction perpendicular to the vertical direction, the electrode lead being bent for surface contact in the vertical direction with an adjacent electrode lead, the electrode lead having a protruding part that protrudes forward in the depth direction from a front side end thereof;
   a sensing terminal module having a plurality of sensing terminals made of an electrically conductive material and a plurality of terminal seating holes in which corresponding ones of the sensing terminals are seated and supported, the protruding part of each electrode lead being press-fit without welding into a corresponding one of the sensing terminals which compresses around the protruding part, the protruding part of each electrode lead having a width that is larger than a corresponding width of an opening within the corresponding one of the sensing terminals; and
   a sensing cover coupled to a side surface of the cell assembly at which the electrode leads are disposed, the sensing cover covering the electrode leads,
   wherein the sensing cover has a module seating part on which the sensing terminal module is supported and seated in an opposite direction to the cell assembly,
   wherein each sensing terminal includes a contact terminal part and a compression terminal part, the contact terminal part being in contact with the corresponding protruding part, the compression terminal part extending from opposite sides of the contact terminal part and compressing around the protruding part, and
   wherein the contact terminal part of each sensing terminal has a pressing protrusion therein that presses into a surface of the corresponding protruding part.

2. A battery module comprising:
   a cell assembly including a plurality of battery cells stacked in a vertical direction, each battery cell having an electrode lead in a shape of a plate that protrudes forward in a depth direction perpendicular to the vertical direction, the electrode lead being bent for surface contact in the vertical direction with an adjacent electrode lead, the electrode lead having a protruding part that protrudes forward in the depth direction from a front side end thereof; and
   a sensing terminal module having a plurality of sensing terminals made of an electrically conductive material and a plurality of terminal seating holes in which corresponding ones of the sensing terminals are seated and supported, the protruding part of each electrode lead being press-fit without welding into a corresponding one of the sensing terminals which compresses around the protruding part, the protruding part of each electrode lead having a width that is larger than a corresponding width of an opening within the corresponding one of the sensing terminals, wherein each sensing terminal includes a contact terminal part and a compression terminal part, the contact terminal part being in contact with the corresponding protruding part, the compression terminal part extending from opposite sides of the contact terminal part and compressing around the protruding part, wherein the contact terminal part of each sensing terminal has a pressing protrusion therein that presses into a surface of the corresponding protruding part, wherein the cell assembly includes a plurality of adhesive members, each adhesive member being provided between an adjacent pair of the electrode leads in surface contact with the electrode leads so as to adhere the electrode leads to one another, and each adhesive member is made of an electrically conductive material.

3. The battery module according to claim 2, wherein each of the adhesive members is provided between adjacent ones of the protruding parts so as to adhere the protruding parts to one another.

4. The battery module according to claim 1, wherein each protruding part has a width in a horizontal direction perpendicular to the vertical direction and the depth direction that is equal to or less than a width of the corresponding electrode lead in the horizontal direction.

5. The battery module according to claim 2, further comprising:

a sensing cover coupled to a side surface of the cell assembly at which the electrode leads are disposed, the sensing cover covering the electrode leads.

6. The battery module according to claim 1, wherein the sensing cover has a plurality of through-holes, each through-hole extending in the depth direction, each protruding part being inserted into a corresponding one of the through-holes.

7. The battery module according to claim 1, wherein the sensing cover has a module seating part onto which the sensing terminal module is seated and supported, the module seating part extending away from the cell assembly in the depth direction.

8. A battery pack comprising the battery module according to claim 1.

9. A vehicle comprising the battery module according to claim 1.

* * * * *